(12) United States Patent
Pfaff et al.

(10) Patent No.: US 8,337,611 B2
(45) Date of Patent: *Dec. 25, 2012

(54) EFFECT PIGMENTS

(75) Inventors: Gerhard Pfaff, Muenster (DE); Johann Dietz, Dietzenbach (DE); Sabine Schoen, Herten (DE); Doreen Warthe, Griesheim (DE)

(73) Assignee: Merck Patent GmbH, Darmstadt (DE)

( * ) Notice: Subject to any disclaimer, the term of this patent is extended or adjusted under 35 U.S.C. 154(b) by 131 days.

This patent is subject to a terminal disclaimer.

(21) Appl. No.: 12/706,884

(22) Filed: Feb. 17, 2010

(65) Prior Publication Data

US 2010/0151047 A1 Jun. 17, 2010

Related U.S. Application Data

(62) Division of application No. 11/808,267, filed on Jun. 7, 2007, now Pat. No. 7,691,196.

(30) Foreign Application Priority Data

Jun. 8, 2006 (DE) .......................... 10 2006 027 025

(51) Int. Cl.
C04B 14/20 (2006.01)
C09C 1/00 (2006.01)
C09D 11/00 (2006.01)
B32B 5/16 (2006.01)
B05D 7/00 (2006.01)

(52) U.S. Cl. ....... 106/417; 106/31.6; 106/415; 428/363; 427/218; 424/401

(58) Field of Classification Search ................ 106/415, 106/417, 493; 424/63, 64, 401; 427/218–219; 428/363; 47/57.6; 426/540; 524/449
See application file for complete search history.

(56) References Cited

U.S. PATENT DOCUMENTS

| 3,870,787 | A | | 3/1975 | Blumenthal |
| 5,221,341 | A | * | 6/1993 | Franz et al. ................... 106/449 |
| 5,320,835 | A | * | 6/1994 | Pahlck et al. .................. 424/64 |
| 5,783,176 | A | * | 7/1998 | Meiring et al. ................ 424/64 |
| 2004/0191198 | A1 | | 9/2004 | Hochstein et al. |
| 2005/0176850 | A1 | * | 8/2005 | Schmidt et al. ............... 523/160 |

FOREIGN PATENT DOCUMENTS

| JP | 07-157689 | 6/1995 |
| JP | 2003277479 | 3/2005 |

OTHER PUBLICATIONS

Office Action dated May 15, 2009 from U.S. Appl. No. 11/808,267, filed Jun. 7, 2007.

* cited by examiner

*Primary Examiner* — Pegah Parvini
(74) *Attorney, Agent, or Firm* — Millen, White, Zelano & Branigan, P.C.

(57) ABSTRACT

Disclosed are yellowing-stable, silver-white effect pigments having high whiteness based on synthetic mica flakes and to the use thereof in paints, lacquers, printing inks, plastics, button pastes, ceramic materials, glasses, for coloring seed, as dopant in laser markings of plastics and papers, as additive for laser welding of plastics, as additive for coloring in the foods and pharmaceuticals sectors and in cosmetic formulations, and for the preparation of pigment compositions and dry preparations.

18 Claims, No Drawings

EFFECT PIGMENTS

This application is a divisional of U.S. patent application Ser. No. 11/808,267, filed on Jun. 7, 2007 now U.S. Pat. No. 7,691,196.

The present invention relates to yellowing-stable, silver-white effect pigments having high whiteness based on synthetic mica flakes and to the use thereof, in particular in paints, lacquers, printing inks, plastics, as dopant for the laser marking of plastics and papers, as additive in the foods and pharmaceuticals sector and in cosmetic formulations.

Silver-white lustre or effect pigments are employed in many areas of technology, in particular in the area of automobile paints, decorative coatings, in plastics, in paints, printing inks and in cosmetic formulations. Silver-white effect pigments (pearlescent pigments) based on natural mica (muscovite) and synthetic mica are known.

The silver-white effect pigments available on the market generally consist of natural mica flakes which are covered with a thin titanium-dioxide layer. Owing to the natural formation, muscovite micas always comprise foreign constituents, such as, for example, iron compounds, which generally result in a slight coloration. By contrast, synthetic phlogopite mica can be pre-pared in such a way that it is virtually free from foreign constituents. It therefore usually has no coloration. Synthetic mica therefore offers a good alternative to natural mica, particularly for the development of silver-white effect pigments.

The commercially available synthetic mica is generally prepared via a melt process starting from oxides, carbonates and fluorides. After the melt has cooled, mica flakes can be produced in a favourable manner using specific mechanical comminution methods starting from the coarse mica crumbs formed after the melt. The flakes are fractionated, giving certain particle-size fractions and thicknesses. They can subsequently serve as substrate material for the preparation of effect pigments. In this case, the mica flakes are subsequently coated with a metal oxide. Pigments of this type are available on the market. These pigments are distinguished by a broad particle-size and thickness distribution.

Titanium-dioxide-coated synthetic mica flakes are also described in the patent literature, for example in U.S. Pat. No. 3,087,828, EP 0 723 997 B1, WO 2002/033007 and CN 1664021 A.

However, disadvantages of the effect pigments known from the prior art, based on synthetic mica flakes coated with $TiO_2$, are the low yellowing stability of these pigments in polymer systems and the occurrence of strong scattering effects.

The object of the present invention is therefore to provide silver-white effect pigments having high whiteness and lustre which at the same time have high yellowing stability and do not have the above-mentioned disadvantages.

Surprisingly, it has now been found that coating of synthetic mica flakes having a precisely defined particle size with a high-refractive-index coating of titanium dioxide and a low-solubility alkaline-earth metal compound results in silver-white effect pigments which are distinguished not only by their whiteness, but also by their high yellowing stability. Compared with the $TiO_2$-coated synthetic mica flakes known from the prior art, the effect pigments prepared in this way furthermore exhibit
  a pure-white mass tone
  a very bright and strong lustre and
  high hiding power.

The present invention therefore relates to yellowing-stable, silver-white effect pigments having high whiteness which are distinguished by the fact that they are based on synthetic mica flakes which have an equivalence diameter distribution according to which 90% of the particles are in the range from 2 to 40 μm, and a thickness distribution according to which 90% of the particles are in the range from 100 to 3500 nm, and which have a coating having a refractive index $\geq 1.9$ comprising titanium dioxide and one or more low-solubility alkaline-earth metal compounds and/or zinc oxide.

The present invention furthermore relates to the use of the silver-white effect pigments according to the invention in paints, lacquers, printing inks, plastics, button pastes, ceramic materials, glasses, for coating seed, as additive for the laser welding of plastics, as dopant in the laser marking or laser welding of plastics and papers, as additive for colouring in the foods and pharmaceuticals sector and in cosmetic formulations. The pigments according to the invention are furthermore also suitable for the preparation of pigment compositions and for the preparation of dry preparations, such as, for example, granules, chips, pellets, briquettes, etc. The dry preparations are particularly suitable for printing inks and for cosmetic formulations.

Essential factors for the silver-white effect pigments according to the invention are the base substrate and the particle size thereof. The effect pigments based on synthetic mica which are available on the market, for example from Sky Chemical and Topy Kogyo, are distinguished by a very broad particle-size and thickness distribution.

In order to achieve high whiteness of the silver-white effect pigments according to the invention, however, the precise setting of the particle size of the starting substrate is of importance. About 25 whiteness formulae exist for the definition of whiteness, relating to measurements on pure pulverulent materials, such as pigments or fillers, but also to measurements on application media comprising the pigments or fillers. The whiteness generally plays an important role in white pigments and fillers. A method for the determination of whiteness is given in ASTM E 313-73. Various whitenesses serve to link physiological and mental perception by the eye to physically determined brightness. In addition, the whiteness formulae also take coloured components into account to a greater or lesser extent. The term "whiteness" itself is not a directly accessible measurement quantity. It is a value which can be calculated from formulae with the aid of colour measurement values, depending on the area of application. These formulae differ in that they give more or less weighting to certain coloured components.

Suitable mica flakes for the silver-white effect pigments according to the invention have an equivalence diameter distribution according to which 90% of the particles are in the range from 2 to 40 μm, preferably from 5 to 40 μm, in particular from 3 to 35 μm, very particularly preferably from 5 to 30 μm. Besides the equivalence diameter distribution, the thickness distribution of the mica flakes likewise plays a role. Thus, suitable base substrates preferably have a thickness distribution according to which 90% of the particles are in the range from 100 to 3500 nm, preferably 200 to 2600 nm, in particular 250 to 2200 nm.

The aspect ratio (diameter/thickness ratio) of the synthetic mica flakes is preferably 5-200, in particular 7-150 and very particularly preferably 10-100.

Synthetic mica flakes having these dimensions can be prepared by the grinding methods and classification methods known to the person skilled in the art.

The synthetic mica is preferably fluorophlogopite in the usual chemical tolerances of the composition.

The synthetic mica flakes having the precisely set particle sizes are subsequently coated with a high-refractive-index layer comprising at least one low-solubility alkaline-earth metal compound in addition to titanium dioxide. The refractive index of this layer is ≧1.9, preferably ≧2.0 and in particular ≧2.1. This high-refractive-index coating is a mixture of $TiO_2$ and a low-solubility alkaline-earth metal compound and/or zinc oxide or is two separate layers. In this case, a thin layer of a low-solubility alkaline-earth metal compound or zinc oxide is applied to the $TiO_2$ layer.

The high-refractive-index coating generally has layer thicknesses of 20-130 nm, preferably 30-100 nm and in particular 40-70 nm.

The titanium dioxide in the high-refractive-index coating can be in the rutile or anatase modification, preferably in the form of rutile. The processes for the preparation of rutile are described, for example, in the prior art in U.S. Pat. No. 5,433,779, U.S. Pat. No. 4,038,099, U.S. Pat. No. 6,626,989, DE 25 22 572 C2, and EP 0 271 767 B1. Before the precipitation of $TiO_2$ onto the mica flake, a thin tin dioxide layer (<10 nm) is preferably applied, serving as additive in order to obtain the $TiO_2$ as rutile phase.

Besides the titanium dioxide, the high-refractive-index coating comprises, as further important constituent, one or more low-solubility alkaline-earth metal compounds. The high-refractive-index coating preferably consists of $TiO_2$ and a low-solubility alkaline-earth metal titanate, alkaline-earth metal stannate and/or alkaline-earth metal zirconate. Alternatively, zinc oxide can also be employed in combination with or instead of the said alkaline-earth metal compounds. In the case of separate layers, a low-solubility alkaline-earth metal titanate, alkaline-earth metal stannate and/or alkaline-earth metal zirconate and/or zinc oxide is applied to the $TiO_2$ layer, which is preferably in the form of rutile.

In a particularly preferred embodiment, the alkaline-earth metal titanate in the high-refractive-index coating consists of magnesium titanate, calcium titanate, strontium titanate or barium titanate, the alkaline-earth metal stannate consists of magnesium stannate, calcium stannate, strontium stannate or barium stannate, and the alkaline-earth metal zirconate consists of magnesium zirconate, calcium zirconate, strontium zirconate or barium zirconate. A mixture of the alkaline-earth metal compounds is furthermore also possible.

Particularly preferred effect pigments have a high-refractive-index coating comprising titanium dioxide and at least one low-solubility alkaline-earth metal compound which is $MgTiO_3$, $CaTiO_3$, $SrTiO_3$, $BaTiO_3$, $MgSnO_3$, $CaSnO_3$, $SrSnO_3$, $BaSnO_3$, $MgZrO_3$, $CaZrO_3$, $SrZrO_3$ or $BaZrO_3$.

Preferred effect pigments have a high-refractive-index coating consisting of
$TiO_2$ (anatase)+calcium titanate
$TiO_2$ (rutile)+calcium titanate
$TiO_2$ (anatase)+calcium zirconate
$TiO_2$ (rutile)+calcium zirconate
$TiO_2$ (anatase)+calcium stannate
$TiO_2$ (rutile)+calcium stannate
$TiO_2$ (anatase)+zinc oxide
$TiO_2$ (rutile)+zinc oxide
$TiO_2$ (anatase)+zinc oxide+calcium titanate
$TiO_2$ (rutile)+zinc oxide+calcium titanate
$TiO_2$ (anatase)+calcium titanate+zinc oxide
$TiO_2$ (rutile)+calcium titanate+zinc oxide The high-refractive-index coating preferably consists exclusively of titanium dioxide and zinc oxide and/or one or more low-solubility alkaline-earth metal compounds, in particular alkaline-earth metal titanate, alkaline-earth metal stannate and/or alkaline-earth metal zirconate. Particularly preferred coatings consist of 90.0 to 99.8% by weight of titanium dioxide and 0.2 to 10% by weight of zinc oxide and/or one or more low-solubility alkaline-earth metal compounds, preferably a low-solubility alkaline-earth metal titanate, alkaline-earth metal stannate and/or alkaline-earth metal zirconate. In the case of a mixture of zinc oxide and a low-solubility alkaline-earth metal compound, the zinc oxide:alkaline-earth metal compound weight ratio is 9:1 to 1:9, in particular 1:1 to 5:1. A layer of this type preferably consists of calcium titanate and zinc oxide. The layers may be applied here either successively or also in the form of a mixed layer. The zinc-oxide layer here can be applied directly to the titanium dioxide layer or as outer layer to the alkaline-earth metal compound.

The titanium dioxide and the low-solubility alkaline-earth metal compound may be present as a mixture in a single layer or may be applied to the substrate as two separate layers. If the high-refractive-index coating consists of two layers, the titanium-dioxide layer preferably has layer thicknesses of 20-100 nm, preferably 30-80 nm and in particular 40-60 nm. The second layer comprising the low-solubility alkaline-earth metal compound and/or zinc oxide generally has layer thicknesses of 1-30 nm, preferably 3-15 nm and in particular 4-10 nm. The total thickness of the second layer should not exceed 30 nm, irrespective of whether this layer consists of one or more alkaline-earth metal compounds or zinc oxide or of a mixture of alkaline-earth metal compound and zinc oxide or whether separate layers of alkaline-earth metal compound and zinc oxide are involved.

The silver-white effect pigments according to the invention can be prepared relatively easily.

Firstly, the commercially available synthetic mica particles or the synthetic mica crumbs are mechanically comminuted and classified in accordance with the requirements with respect to equivalence diameter and thickness of the flakes by means of sedimentation, decantation, air classification and/or sieving.

The mica flakes are then coated with the high-refractive-index coating, which is preferably applied by wet-chemical methods, it being possible to use the wet-chemical coating methods developed for the preparation of pearlescent pigments. Methods of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications known to the person skilled in the art.

The synthetic mica flakes are preferably coated with titanium dioxide by wet-chemical methods by the chloride or sulfate process.

In order to produce the alkaline-earth metal layer, a water-soluble alkaline-earth metal salt or a mixture of water-soluble alkaline-earth metal salts and a water-soluble zinc, titanium, tin and/or zirconium salt is added to an aqueous suspension comprising the $TiO_2$-coated synthetic mica flakes at suitable pH. Instead of water, it is also possible to employ water-containing solvents based on short-chain alcohols, such as, for example, methanol, ethanol, propanol or isobutanol, as solvent. Suitable alkaline-earth metal salts are, inter alia, the alkaline-earth metal chlorides, furthermore also the alkaline-earth metal nitrates and other water-soluble alkaline-earth metal compounds. During preparation of alkaline-earth metal titanates, zirconates and stannates, the corresponding chlorides, sulfates and nitrates of titanium, tin and/or zirconium are usually used in purely aqueous medium.

In order to produce the alkaline-earth metal layer, use is preferably made of the peroxide process, in which, in addition to the soluble alkaline-earth metal compounds and the soluble compounds of titanium, tin and/or zirconium, hydrogen peroxide is added to the suspension of the titanium-dioxide-coated mica flakes.

The silver-white effect pigments according to the invention are generally prepared by suspending the synthetic mica flakes in water and adding one or more hydrolysable titanium salts at a pH which is suitable for the precipitation and which is selected in such a way that the metal oxide or metal oxide hydrate is deposited directly onto the flakes without significant secondary precipitations occurring. The pH is usually kept constant by simultaneous metered addition of a base and/or acid. The subsequent coating with the zinc oxide and/or alkaline-earth metal titanate, stannate and/or zirconate is usually carried out without prior work-up of the $TiO_2$-coated mica pigment. The coating is generally carried out by addition of the dissolved alkaline-earth metal chlorides, the dissolved chlorides of titanium, tin and/or zirconium and of hydrogen peroxide.

A calcium titanate is preferably applied to the $TiO_2$-coated mica flake. The precipitation of titanium complexes of this type is described, for example, in G. Pfaff, Z. Chem. 28 (1988) 76 and Z. Chem. 29 (1989) and loc. cit.

After filtration and washing, the coated substrates are firstly dried for 20-60 min at temperatures of 50-150° C., preferably 80-120° C., and subsequently calcined at 600 to 1200° C., preferably at 700-1000° C., in particular at 700-900° C., for 0.3-1 h, preferably 0.5-0.8 h.

The coating of the $TiO_2$ layer can furthermore also be carried out in a fluidised-bed reactor by gas-phase coating, where, for example, the processes proposed in EP 0 045 851 A1 and EP 0 106 235 A1 for the preparation of pearlescent pigments can be used correspondingly.

Besides the high whiteness, the silver-white effect pigments prepared in this way are distinguished by significantly higher yellowing stability and significantly lower surface activity compared with the commercially available silver-white effect pigments based on synthetic mica. Besides the high yellowing stability, the pigments prepared in this way also have very good photostability in the powder, but also in application systems, such as plastics, lacquers or printing inks.

The increased whiteness can best be demonstrated on direct visual comparison of the effect pigments prepared in this way in plastic platelets, lacquer films or prints. Effect pigments having similar morphology based on natural mica which have the same layer structure consisting of titanium dioxide and alkaline-earth metal titanate, stannate and/or zirconate serve as comparison here.

The high yellowing stability of the effect pigments according to the invention compared with conventional silver-white effect pigments can be demonstrated visually or calorimetrically in the reaction of a pigment suspension in propanol and dibutyl phthalate with a propyl gallate solution, where the discoloration towards yellow (visual) or the shift in the b value (L*a*b* colour system) towards +b (calorimetric, for example using a Johne-Reilhofer instrument) is monitored and compared.

In order additionally to increase the light, water and weather stability, it is frequently advisable to subject the finished silver-white effect pigment to aftercoating or aftertreatment, depending on the area of application. Suitable aftercoatings or aftertreatments are, for example, the processes described in German Patent 22 15 191, DE-A 31 51 354, DE-A 32 35 017 or DE-A 33 34 598. This aftercoating further increases the chemical stability or simplifies handling of the pigment, in particular incorporation into various media. In order to improve the wettability, dispersibility and/or compatibility with the application media, functional coatings comprising $Al_2O_3$ or $ZrO_2$ or mixtures or mixed phases thereof can be applied to the pigment surface. Furthermore, organic or combined organic/inorganic aftercoatings are possible, for example with silanes, as described, for example, in EP 0090259, EP 0 634 459, WO 99/57204, WO 96/32446, WO 99/57204, U.S. Pat. No. 5,759,255, U.S. Pat. No. 5,571, 851, WO 01/92425 or in J. J. Ponjeé, Philips Technical Review, Vol. 44, No. 3, 81 ff. and P. H. Harding J. C. Berg, J. Adhesion Sci. Technol. Vol. 11, No. 4, pp. 471-493.

Since the silver-white effect pigments according to the invention, besides high yellowing stability, combine a bright and strong lustre with pure-white mass tone, particularly effective effects in the various application media can be achieved with them.

It goes without saying that the effect pigments according to the invention can also advantageously be used for the various applications as a blend with organic dyes, organic pigments or inorganic pigments, such as, for example, transparent and opaque white, coloured and black pigments, and with flake-form iron oxides, holographic pigments, LCPs (liquid crystal polymers), transparent, coloured and black lustre pigments based on metal-oxide-coated mica, glass, $Fe_2O_3$, $Al_2O_3$ and $SiO_2$ flakes, etc.

The silver-white effect pigments according to the invention can be mixed with commercially available pigments and fillers in any weight ratio. The ratio is preferably 1:1 to 9:1. If the effect pigments according to the invention are mixed with fillers, the mixing ratio can also be 99:1 to 1:99.

In the various applications, the effect pigment according to the invention can also be combined with further colorants of any type, for example organic and/or inorganic absorption pigments and dyes, multilayered interference pigments, such as, for example, Timiron®, Iriodin® (Merck KGaA), Sico-pearl® (BASF AG), ChromaFlair® (Flex Products Inc.), BiOCl pigments, pearl essence, metal pigments, for example from Eckart. The mixing ratios and concentrations are unlimited here.

The silver-white effect pigments according to the invention are compatible with a multiplicity of colour systems, preferably from the area of paints, lacquers and printing inks. For the preparation of printing inks for, for example, gravure printing, flexographic printing, offset printing, offset overprint varnishing, a multiplicity of binders, in particular water-soluble grades, is suitable, as marketed, for example, by the BASF, Marabu, Pröll, Sericol, Hartmann, Gebr. Schmidt, Sicpa, Aarberg, Siegberg, GSB-Wahl, Follmann, Ruco or Coates Screen INKS GmbH companies. The printing inks can be water-based or solvent-based. Furthermore, the effect pigments according to the invention are also suitable for the laser marking of paper and plastics, and for applications in the agricultural sector, for example for greenhouse sheeting, and, for example, for colouring tarpaulins.

The effect pigments according to the invention can be used for pigmenting lacquers, printing inks, plastics, agricultural sheeting, seed coatings, food colourings, button pastes, medicament coatings or cosmetic formulations, such as lipsticks, nail varnishes, compact powders, shampoos, soaps, loose powders and gels. The concentration of the pigment in the application system to be pigmented is generally between 0.1 and 70% by weight, preferably between 0.1 and 50% by weight and in particular between 0.5 and 10% by weight, based on the total solids content of the system. It is generally dependent on the specific application.

In plastics comprising the silver-white effect pigment according to the invention, preferably in amounts of 0.01 to 50% by weight, in particular 0.1 to 7% by weight, particularly pronounced silver-white effects can be achieved.

In the surface coatings sector, in particular in automobile paints, the effect pigment is employed in amounts of 0.1-20% by weight, preferably 1 to 10% by weight, including for 3-coat systems.

In surface coatings, the effect pigment according to the invention has the advantage that the target lustre is achieved by a single-layer finish (one-coat system or base coat in a two-coat system). Compared with lacquers which comprise, for example, a multilayered pigment based on mica or a conventional pearlescent pigment based on a substrate having a broad thickness distribution instead of the effect pigment according to the invention, finishes comprising the pigment according to the invention exhibit a clearer depth effect and a more pronounced white and lustre effect.

The effect pigment according to the invention can also advantageously be employed in decorative and care cosmetics. The use concentration extends from 0.01% by weight in shampoo to 100% by weight in the case of loose powders. In the case of a mixture of the pigments according to the invention with fillers, preferably with spherical fillers, such as, for example, $SiO_2$, the concentration in the formulation can be 0.01-70% by weight. The cosmetic products, such as, for example, nail varnishes, compact powders, shampoos, loose powders and gels, are distinguished by particularly interesting colour effects and high lustre.

Furthermore, the pigment according to the invention can be employed in bath additives, toothpastes and for the finishing of foods, for example mass colouring and/or coatings of boiled sweets, wine gums, such as, for example, jelly babies, pralines, liquorice, confectionery, sticks of rock, blancmange, fizzy drinks, sodas, etc., or as a coating, for example, in dragees and tablets in the pharmaceuticals sector.

The pigments according to the invention can furthermore be mixed with commercially available fillers. Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped as required.

It is of course also possible for the silver-white effect pigments according to the invention to be combined in the formulations with cosmetic raw materials and assistants of any type. These include, inter alia, oils, fats, waxes, film formers, preservatives and assistants which generally determine the applicational properties, such as, for example, thickeners and rheological additives, such as, for example, bentonites, hectorites, silicon dioxides, Ca silicates, gelatines, high-molecular-weight carbohydrates and/or surface-active assistants, etc.

The formulations comprising the effect pigments according to the invention can belong to the lipophilic, hydrophilic or hydrophobic type. In the case of heterogeneous formulations having discrete aqueous and non-aqueous phases, the effect pigments according to the invention may in each case be present in only one of the two phases or alternatively distributed over both phases.

The pH values of the formulations can be between 1 and 14, preferably between 2 and 11 and particularly preferably between 5 and 8.

No limits are set for the concentrations of the silver-white effect pigments according to the invention in the formulation. They can be—depending on the application—between 0.001 (rinse-off products, for example shower gels) and 100% (for example lustre-effect articles for particular applications).

The effect pigments according to the invention may furthermore also be combined with cosmetic active ingredients. Suitable active ingredients are, for example, insect repellents, UV A/BC protection filters (for example OMC, B3 and MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoin, emblica, allantoin, bioflavonoids and derivatives thereof.

In the pigmenting of binder systems, for example for paints and printing inks for gravure printing, offset printing or screen printing, or as precursors for printing inks, the use of the effect pigments according to the invention in the form of highly pigmented pastes, granules, pellets, etc., has proven particularly suitable. The effect pigment is generally incorporated into the printing ink in amounts of 2-35% by weight, preferably 5-25% by weight and in particular 8-20% by weight. Offset printing inks can comprise the pigments in amounts of up to 40% by weight or more. The precursors for printing inks, for example in the form of granules, as pellets, briquettes, etc., comprise up to 98% by weight of the pigment according to the invention in addition to the binder and additives. Printing inks comprising the pigment according to the invention exhibit purer hues than with conventional effect pigments. The particle thicknesses of the effect pigments according to the invention are relatively small and therefore cause particularly good printability.

The effect pigments according to the invention are furthermore suitable for the preparation of flowable pigment compositions and dry preparations, in particular for printing inks, comprising one or more pigments according to the invention, binders and optionally one or more additives.

The invention thus also relates to formulations comprising the silver-white effect pigments according to the invention.

The invention relates, in particular, to formulations which, besides the effect pigment according to the invention, comprise at least one constituent selected from the group of the absorbents, astringents, antimicrobial substances, antioxidants, antiperspirants, antifoaming agents, antidandruff active ingredients, antistatics, binders, biological additives, bleaching agents, chelating agents, deodorants, emollients, emulsifiers, emulsion stabilisers, dyes, humectants, film formers, fillers, odour substances, flavour substances, insect repellents, preservatives, anticorrosion agents, cosmetic oils, solvents, oxidants, vegetable constituents, buffer substances, reducing agents, surfactants, propellant gases, opacifiers, UV filters and UV absorbers, denaturing agents, viscosity regulators, perfume and vitamins.

The following examples are intended to explain the invention, but without limiting it.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

EXAMPLES

Example 1

100 g of synthetic fluorophlogopite mica having an equivalence diameter distribution of 2-40 µm are suspended in deionised water. The use concentration here is 50 g/l. The pH is adjusted to 2.0, and the suspension is heated to 75° C. Firstly, 100 ml of a 2% tin tetrachloride solution are added. The pH is kept constant at 2.0 by countertitration with 32% sodium hydroxide solution. The pH is subsequently adjusted to 1.8 by addition of hydrochloric acid. 240 ml of 30% titanium tetrachloride solution are then metered in at a pH kept constant at 1.8.

The end point of the $TiO_2$ hydrate layer is given by consumption of the prespecified volume of the solution. The pH is then adjusted to 9.0 by addition of 32% sodium hydroxide solution. 50 ml of an aqueous solution of $CaCl_2$, titanium chloride and hydrogen peroxide (7.2 g of $CaCl_2 \times 2H_2O$, 0.08 mol of $TiCl_4$, 6 ml of a 30% hydrogen peroxide solution made up to a volume of 50 ml with water) are subsequently metered in at 75° C. over the course of 30 minutes, during which the pH is kept constant. The reaction product is filtered off, washed, dried and calcined at 900° C., giving a silver-white effect pigment which has very high whiteness (visual and colorimetric comparison with Iriodin® 103 from Merck KGaA, Darmstadt, in the polypropylene platelet) and is stable to yellowing (determined visually and colorimetrically by means of the propyl gallate test).

USE EXAMPLES

Example A

Shower Gel

| Phase A | | | |
|---|---|---|---|
| Raw material | Source of supply | INCI | [%] |
| Pigment from Example 1 | Merck KGaA | | 0.10 |
| Keltrol T | Kelco | Xanthan Gum | 0.75 |
| Water, demineralised | | Aqua (Water) | 64.95 |

| Phase B | | | |
|---|---|---|---|
| Raw material | Source of supply | INCI | [%] |
| Plantacare 2000 UP | Cognis GmbH | Decyl Glucoside | 20.00 |
| Texapon ASV 50 | Cognis GmbH | Sodium Laureth Sulfate, Sodium Laureth-8 Sulfate, Magnesium Laureth Sulfate, Magnesium Laureth-8 Sulfate, Sodium Oleth Sulfate, Magnesium Oleth Sulfate | 3.60 |
| Bronidox L | Cognis GmbH | Propylene Glycol, 5-Bromo-5-Nitro-1,3-Dioxane | 0.20 |
| Everest 79658 SB perfume oil | Haarmann & Reimer GmbH | Parfum | 0.05 |
| 1% FD&C Blue No. 1 in water | BASF AG | Aqua (Water), CI 42090 (FD&C Blue No. 1) | 0.20 |

| Phase C | | | |
|---|---|---|---|
| Raw material | Source of supply | INCI | [%] |
| Citric acid monohydrate | Merck KGaA/Rona ® | Citric Acid | 0.15 |
| Water, demineralised | | Aqua (Water) | 10.00 |

Preparation:

For phase A, stir the interference pigment into the water. Slowly scatter in the Keltrol T with stirring and stir until it has dissolved. Add phases B and C successively while stirring slowly until everything is homogeneously distributed. Adjust the pH to 6.0 to 6.4.

Example B

Nail Varnish

| Raw material | Source of supply | INCI | [%] |
|---|---|---|---|
| Pigment from Example 1 | Merck KGaA | | 2.00 |
| Thixotropic nail varnish base 1348 | International Lacquers S.A. | Toluene, Ethyl Acetate, Butyl Acetate, Nitrocellulose, Tosylamide/Formaldehyde Resin, Dibutyl Phthalate, Isopropyl Alcohol, Stearalkonium Hectorite, Camphor, Acrylates Copolymer, Benzophenone-1 | 98.00 |

Preparation:

The interference pigment is weighed out together with the varnish base, mixed well by hand using a spatula and subsequently stirred for 10 min at 1000 rpm.

Example C

Lacquer System

90% by weight of Hydroglasur BG/S colourless (water-borne coating from Ernst Diegel GmbH)

10% by weight of silver-white effect pigment from Example 1

Coating by spraying at 80° C.

Pre-drying for 5 min at 80° C.

Baking for 20 min at 180° C.

Example D

Plastic 1 kg of polystyrene granules is uniformly wetted with 5 g of adhesive in a tumble mixer. 42 g of green interference pigment from Example 1 are then added, and the granules are mixed for 2 min. These granules are converted into stepped platelets measuring 4×3×0.5 cm under conventional conditions in an injection-moulding machine. The stepped platelets are distinguished by their pronounced sparkle effect.

Example E

Colouring of Confectionery

Raw materials: effervescent sweets, white
Spray Solution:
94% of alcoholic shellac solution from Kaul
6% of silver-white effect pigment from Example 1

The effervescent sweets are sprayed with an interference pigment/shellac solution until the desired colour application has been reached. Subsequent drying using cold air is possible.

The products from Examples A-E are distinguished by their high lustre, a pure colour and high photostability.

The preceding examples can be repeated with similar success by substituting the generically or specifically described reactants and/or operating conditions of this invention for those used in the preceding examples.

The entire disclosure[s] of all applications, patents and publications, cited herein and of corresponding German application No. 102006027025.8, filed Jun. 8, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Effect pigments, comprising
synthetic mica flakes having an equivalence diameter distribution according to which 90% of the particles are in the range of 2 to 40 μm, and a thickness distribution according to which 90% of the particles are in the range of 100 to 3500 nm, and
have a coating with a refractive index $\geq 1.9$, which comprises
titanium dioxide,
and one or more low-solubility alkaline-earth metal compounds
and optionally zinc oxide,
wherein the low-solubility alkaline-earth metal compound is
an alkaline-earth metal stannate, which is magnesium stannate, calcium stannate, strontium stannate or barium stannate, or
an alkaline-earth metal zirconate, which is magnesium zirconate, calcium zirconate, strontium zirconate or barium zirconate,
or
wherein the mica flakes have a first layer of titanium dioxide and a second layer of zinc oxide and one or more low-solubility alkaline-earth metal compounds.

2. Effect pigments according to claim 1, wherein the aspect ratio (diameter/thickness ratio) of the mica flakes is 5-200.

3. Effect pigments according to claim 1, wherein the synthetic mica is fluorophlogopite.

4. Effect pigments according to claim 1, wherein the alkaline-earth metal stannate is magnesium stannate, calcium stannate, strontium stannate or barium stannate.

5. Effect pigments according to claim 1, wherein the alkaline-earth metal zirconate is magnesium zirconate, calcium zirconate, strontium zirconate or barium zirconate.

6. Effect pigments according to claim 1, wherein the mica flakes have a first layer of titanium dioxide and a second layer of zinc oxide and one or more low-solubility alkaline-earth metal compounds.

7. Effect pigments according to claim 1, wherein the synthetic mica flakes have a coating of
$TiO_2$ (anatase)+calcium titanate;
$TiO_2$ (rutile)+calcium titanate;
$TiO_2$ (anatase)+calcium zirconate;
$TiO_2$ (rutile)+calcium zirconate;
$TiO_2$ (anatase)+calcium stannate;
$TiO_2$ (rutile)+calcium stannate;
$TiO_2$ (anatase)+zinc oxide+calcium titanate;
$TiO_2$ (rutile)+zinc oxide+calcium titanate;
$TiO_2$ (anatase)+calcium titanate+zinc oxide; or
$TiO_2$ (rutile)+calcium titanate+zinc oxide.

8. A process for preparing effect pigments according to claim 1, comprising applying the coating to the synthetic mica flakes by a wet-chemical method or by hydrolytic decomposition of a metal salt in an aqueous medium.

9. A paint, button paste, lacquer, printing ink, security printing ink, plastic composition or article, ceramic material, glass composition or article, seed coating, dopant for a laser marking of plastics or paper, additive for laser welding of plastics, additive for coloring food or a pharmaceutical, cosmetic formulation, pigment composition or dry preparation, comprising effect pigments according to claim 1.

10. A composition comprising effect pigments according to claim 1 and one or more of absorbents, astringents, antimicrobial substances, antioxidants, antiperspirants, antifoaming agents, antidandruff active ingredients, antistatics, binders, biological additives, bleaching agents, chelating agents, deodorants, emollients, emulsifiers, emulsion stabilisers, dyes, humectants, film formers, fillers, odor substances, flavor substances, insect repellents, preservatives, anticorrosion agents, cosmetic oils, solvents, oxidants, vegetable constituents, buffer substances, reducing agents, surfactants, propellant gases, opacifiers, UV filters, UV absorbers, denaturing agents, viscosity regulators, perfumes and/or vitamins.

11. A pigment composition comprising one or more binders and effect pigments according to claim 1.

12. A dry preparation comprising effect pigments according to claim 1.

13. Effect pigments according to claim 1, wherein the equivalence diameter distribution according to which 90% of the particles are in the range of 5 to 30 μm, or the thickness distribution according to which 90% of the particles are in the range of 250 to 2200 nm, or the coating has a refractive index $\geq 2.1$.

14. Effect pigments according to claim 1, wherein the synthetic mica flakes have thereon a single coating which consists essentially of titanium dioxide and one or more alkaline-earth metal compounds and optionally zinc oxide, wherein the coating is a mixture of titanium dioxide and one or more low-solubility alkaline-earth metal compounds and optionally zinc oxide or contains two separate layers wherein the titanium dioxide is in a different layer than the one or more low-solubility alkaline-earth metal compounds and the optional zinc oxide.

15. Effect pigments according to claim 1, wherein the synthetic mica flakes have thereon a single coating which consists of titanium dioxide and one or more low-solubility alkaline-earth metal compounds and optionally zinc oxide, wherein the coating is a mixture of titanium dioxide and one or more low-solubility alkaline-earth metal compounds and optionally zinc oxide or contains two separate layers wherein the titanium dioxide is in a different layer than the one or more low-solubility alkaline-earth metal compounds and the optional zinc oxide.

16. Effect pigments according to claim 1,
wherein the titanium dioxide is in a first layer on the synthetic mica flakes, and the one or more low-solubility alkaline-earth metal compounds and the optional zinc oxide are in a second layer on the first layer.

17. Effect pigments according to claim 16, wherein the synthetic mica flakes have a coating of
$TiO_2$ (anatase)+calcium titanate;
$TiO_2$ (rutile)+calcium titanate;
$TiO_2$ (anatase)+calcium zirconate;
$TiO_2$ (rutile)+calcium zirconate;
$TiO_2$ (anatase)+calcium stannate;
$TiO_2$ (rutile)+calcium stannate
$TiO_2$ (anatase)+zinc oxide+calcium titanate;
$TiO_2$ (rutile)+zinc oxide+calcium titanate;
$TiO_2$ (anatase)+calcium titanate+zinc oxide; or
$TiO_2$ (rutile)+calcium titanate+zinc oxide.

18. Effect pigments according to claim 16, wherein the first layer consists essentially of titanium dioxide and the second layer consists essentially of one or more low-solubility alkaline-earth metal compounds and optionally zinc oxide.

* * * * *